Figure 1:
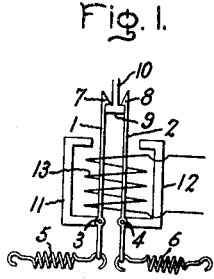

Jan. 24, 1950

C. D. HAYWARD 2,495,633

SHOCKPROOF HOLDING DEVICE

Original Filed Jan. 10, 1944

Inventor:
Claude D. Hayward,
by Ernest C. Britton
His Attorney.

Patented Jan. 24, 1950

2,495,633

UNITED STATES PATENT OFFICE 2,495,633

SHOCKPROOF HOLDING DEVICE

Claude D. Hayward, Lansdowne, Pa., assignor to General Electric Company, a corporation of New York Original application January 10, 1944, Serial No. 517,651. Divided and this application December 13, 1945, Serial No. 634,792

2 Claims. (Cl. 200—103)

My invention relates to improvements in shock-proof holding devices and more particularly to shock-proof latching mechanisms for electric switches such as circuit breakers and the like.

Equipment for use for warcraft is subject to false operation because of mechanical shock due to the firing of guns on the craft and the explosion of enemy shells on or near the craft. These shocks are often of extreme severity, and they may be of a translational nature in any direction or, in consequence of whipping of the supports of the equipment, they may be of a rotational character. Of course, a latching mechanism could be made proof against operation on any reasonable mechanical shock by restraining the motion of the moving parts with a sufficiently strong spring or by introducing a sufficient amount of friction. This, however, is undesirable because the latching mechanism is thereby made very insensitive to operation in the intended manner. In other words, in order to overcome the restraining effect, a great force or power must be applied to the latching part in order to effect operation of the device on the occurrence of abnormal circuit conditions. This great operating force or power is obtainable only at the sacrifice of sensitivity of response. Latching mechanisms have been made using rotating parts balanced about the axis of rotation so that a translational shock does not cause them to operate. Such arrangements, however, are not proof against operation on a rotational shock.

An object of my invention is to provide an improved arrangement for rendering devices proof against operation on either translational or rotational shock without materially interfering with their intended operational response. Another object of my invention is to provide an improved arrangement for rendering devices shock-proof by combining existing devices in accordance with the principle of my invention. These and other objects of my invention will appear in more detail hereinafter.

In accordance with my invention, I provide a two-position shock-proof holding device wherein two relatively movable members are jointly and severally capable of maintaining the device in a given condition without altering said condition on the occurrence of shock and yet are capable of being moved in opposite directions so as jointly to effect a desired change in such condition of the device. Finally, in accordance with my invention, these members may be two armatures, two thermally responsive members, two toggles, two latches or, in general, any two similar elements which are designed to respond to a given condition in an electrical circuit or in a fluid circuit or other physical condition that is subject to change.

This application is a division of my copending application, Serial No. 517,651, filed January 10, 1944, and subsequently abandoned, and assigned to the same assignee as this application.

My invention will be better understood from the following description when considered in connection with the accompanying sheet of drawings, and its scope will be pointed out in the appended claims.

Figure 2:
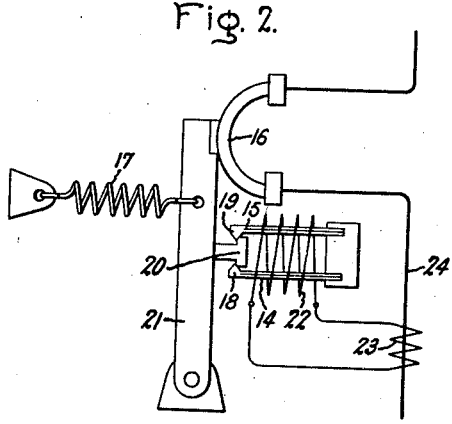
Figure 3:
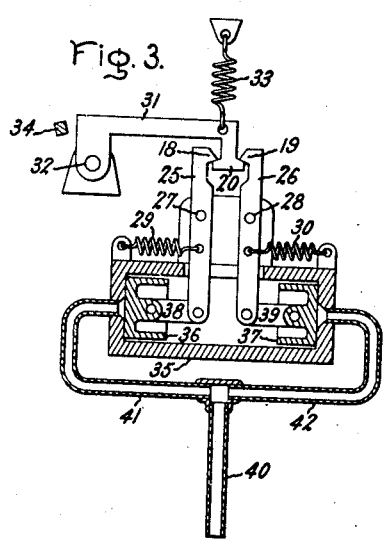
Figure 4:
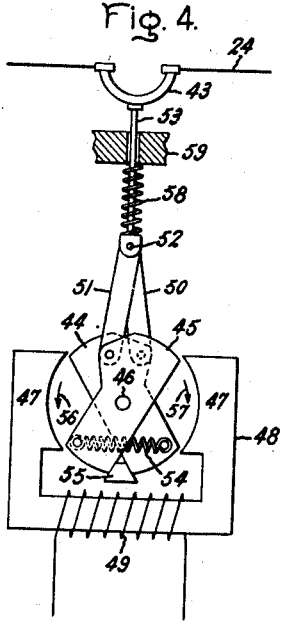

In the accompanying sheet of drawings, Fig. 1 diagrammatically illustrates a shock-proof holding device embodying my invention; Fig. 2 is a diagrammatic view of a circuit breaker thermally responsive latching mechanism embodying my invention; Fig. 3 is an elevation, partly in section, of a fluid pressure operated latching mechanism embodying my invention; and Fig. 4 is an elevation of a circuit breaker toggle latching mechanism embodying my invention.

The shock-proof holding device or latching mechanism shown in Fig. 1 comprises two relatively freely movable elements such as two rotatably mounted armatures 1 and 2 respectively pivoted at 3 and 4. These armatures 1 and 2 are biased for movement in opposite directions by suitable similar means such as springs 5 and 6, respectively, to a holding position wherein latch engaging or hook portions 7 and 8, respectively, jointly engage a suitable enlargement 9 on a member 10 which is to be held downward against a bias, not shown. For moving the armature members 1 and 2 to the release position, I provide suitable electromagnetic means such as magnetic cores 11 and 12 which have a common energizing winding 13.

Assuming now that the holding device in Fig. 1 is subjected to a translational shock applied from the right-hand side, then if the armatures 1 and 2 are not balanced about their respective pivots 3 and 4, this shock will cause both of them to rotate in the same direction, that is clockwise, about their pivots. If the armatures are heavy on the latching end, the armature 2 will turn clockwise probably far enough to release its hook portion 8 from engagement with the member 10, but the armature 1, which also tends to turn clockwise, will maintain its hook portion 7 in engagement with the member 10 to prevent release thereof. Accordingly, no movement of the member 10 will occur. Similarly, a translational shock applied from the left-hand side may result in the release of the hook portion 7 of the armature 1, but the hook portion 8 of the armature 2 will remain in engagement with the member 10. Thus the armatures 1 and 2 are jointly effective to hold the member 10 against any upward bias thereon under normal conditions and severally effective to prevent upward movement of the armature under shock conditions.

It will be apparent to those skilled in the art that my invention is not limited to the use of magnetic structures but may be carried out in other ways, as illustrated, for example, in Fig. 2, which shows a thermally responsive shock-proof circuit breaker latching mechanism. As illustrated in Fig. 2, this mechanism is in many respects similar to the arrangement shown in Fig. 1, except that the operation of the latching elements is effected by substantially identical bimetallic strips 14 and 15 which have their lower ends firmly secured against movement. As shown in Fig. 2, the mechanism is adapted for latching a circuit breaker 16 in the closed circuit position against the bias of an opening spring 17. In this case, the free ends of the bimetallic strips 14 and 15 are respectively provided with hook type latches 18 and 19 which suitably engage a latching projection 20 on the switch operating lever 21. The arrangement is such that both latches must be disengaged by deflection of the two bimetallic strips in opposite directions. For this purpose, the bimetallic strips are arranged with the metal having the higher thermal coefficient of expansion on the sides toward each other so that both strips are bent outward to release the latching projection 20 when the heating current is applied. As indicated, the heating current is applied by a single operating winding 22 which is connected to a current transformer 23 in the circuit 24 controlled by the circuit breaker 16.

It will be obvious to those skilled in the art that, in the embodiment of my invention illustrated in Fig. 2, the single heater coil 22 can be replaced by two similar heater coils, one around each of the bimetallic strips, or the coil or coils can be eliminated entirely by passing the heating current directly through the bimetallic strips. Since the release of the latching projection 20 is dependent solely on joint movement of the thermal elements 14 and 15 in opposite directions, it is obvious that the circuit breaker cannot be falsely tripped by any one mechanical shock since this cannot produce opposite movements of both of the thermal strips.

In connection with the embodiments of my invention shown in Figs. 1 and 2 where the double hook type latch is used, there should be preferably a slight slope on each of the cooperating latching surfaces, as indicated in Fig. 2, so that if one of the latch hooks becomes disengaged in consequence of a shock it will be able to re-engage itself readily. The slope angle should be small so that the latch fingers will not slide down the surfaces and release due to the force of the opening spring 17. The angle should hence be smaller than the friction angle for the engaging surfaces.

In Fig. 3, I have illustrated a fluid pressure operated latching mechanism analogous to the latching arrangement shown in Fig. 2. In the arrangement shown in Fig. 3, the latching hooks 18 and 19 are carried by or form an integral part of two latching levers 25 and 26, respectively pivotally mounted at 27 and 28. These levers are biased for rotation in opposite directions to the latching position by suitable means such as springs 29 and 30, respectively, to cause the latching hooks 18 and 19 to engage opposite sides of a latching projection 20 on a member 31 pivoted at 32 and biased for movement in a predetermined direction, counterclockwise as shown, by a spring 33. The member 31 may be an operating lever or the like for any desired use such, for example, as the operating lever of a circuit breaker.

In order to release the latching hooks 18 and 19 so that the member 31 is free to move counterclockwise from the position shown to some other predetermined position which may be determined by suitable means such as a stop 34, I provide fluid pressure operated means. As shown, this operating means comprises a cylinder 35 within which are mounted pistons 36 and 37 pivotally connected to the levers 25 and 26 through links 38 and 39, respectively. Thus, upon admission of fluid under pressure to the pipe 40 and thence by branch pipes 41 and 42 to the ends of the cylinder 35, the pistons 36 and 37 are caused to move simultaneously toward each other. This effects rotation of the levers 25 and 26 simultaneously in opposite directions against the bias of the springs 29 and 30 so as to disengage the latching hooks 18 and 19 from the latching projection 20 on the operating member 31. Inasmuch as any one mechanical shock cannot move both of the levers 25 and 26 in opposite directions, one of the latching hooks 18 and 19 is maintained in engagement with the latching projection 20 so that a false release of the operating member 31 cannot result in consequence of a mechanical shock.

In Fig. 4, I have shown an embodiment of my invention as applied to a double toggle tripping arrangement for a circuit breaker 43. As illustrated, this tripping arrangement comprises two rotatably mounted tripping armatures 44 and 45 mounted to rotate about a common axis or shaft 46 between the poles 47 of a magnetic structure 48, which is arranged to be energized by a winding 49. This winding, as will be obvious to those skilled in the art, may be energized in any suitable manner either to respond to some electrical quantity of the circuit 24 controlled by the circuit breaker or to a control source for tripping the circuit breaker, as desired. The outer ends of the armatures 44 and 45 are respectively pivotally connected to a pair of substantially identical links 50 and 51, which are in turn pivotally connected as at 52 to a switch operating rod 53. The links 50 and 51 form with their respectively associated armatures two oppositely movable cooperating toggles which are jointly operable in their thrust transmitting positions to maintain the circuit breaker in the closed circuit position. For this purpose, the lower ends of the armatures 44 and 45 are interconnected by suitable biasing means such as a spring 54, which is effective to hold the armatures against a stop 55 with both toggles in an overset or thrust transmitting position somewhat over center. When the winding 49 is energized sufficiently to attract the armatures 44 and 45 whereby to rotate them in opposite directions, as indicated by the arrows 56 and 57, respectively, both of the toggles are collapsed thereby effecting the opening of the circuit breaker in consequence of the bias due to gravity and an opening spring 58 which, as shown, is in the form of a compression spring between the pivotal point 52 and a fixed abutment 59.

With this arrangement, it will be obvious that any kind of a translational or rotational shock which would tend to move one of the toggles in the tripping direction would, at the same time, press the other toggle more firmly against the stop 55 holding it in the rigid or thrust transmitting position. While it may appear that the spring 54 biasing the lower ends of the armatures against the stop 55 is not strictly necessary since the compression spring 58 acting through the two over-center toggles supplies torques tending to hold the armatures against the stop, nevertheless it will be evident that, if one of the toggles should be collapsed by shock, it would not subsequently be returned to the rigid or thrust transmitting position by the action of the compression spring 58. The spring 54, however, would return it.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. Means for holding a movable circuit controlling member in the closed circuit position against the effects of mechanical shock and an opening bias comprising two oppositely movable cooperating toggles jointly operable in their thrust transmitting position to maintain said member in the closed circuit position, and means for collapsing both of said toggles to permit the circuit opening movement of said circuit controlling member including a reversed pair of energizable operating elements responsive in opposite directions upon simultaneous energization thereof and each connected with a corresponding one of the toggles for response in the same direction to shock to maintain each toggle in its holding position upon shock in a corresponding direction.

2. Means for holding a movable circuit controlling member in the closed circuit position against the effects of mechanical shock and an opening bias comprising two oppositely movable cooperating toggles arranged to be overset jointly to maintain said member in the closed circuit position, and electromagnetic means having a reversed pair of oppositely attracted magnetic elements, each connected with a corresponding one of said toggles for simultaneously moving both of said toggles from the overset position to permit a circuit opening movement of said circuit controlling member and each responsive in the same direction to shock for maintaining each toggle in its holding position upon shock in a corresponding direction.

CLAUDE D. HAYWARD.

REFERENCES CITED

The following references are of record in the file of this patent:

UNITED STATES PATENTS

| Number | Name | Date |
| --- | --- | --- |
| 800,538 | Berry | Sept. 26, 1905 |
| 926,584 | Morris et al. | June 29, 1909 |
| 977,577 | Wikander | Dec. 6, 1910 |
| 1,052,595 | Lanphier | Feb. 11, 1913 |
| 1,552,561 | Jacobs | Sept. 8, 1925 |
| 2,353,377 | Vaughn | July 11, 1944 |

FOREIGN PATENTS

| Number | Country | Date |
| --- | --- | --- |
| 110,046 | Austria | June 25, 1928 |